(12) United States Patent
Mori

(10) Patent No.: US 7,679,626 B2
(45) Date of Patent: Mar. 16, 2010

(54) DRIVE CONTROL DEVICE FOR A DISPLAY APPARATUS, VIDEO IMAGE DISPLAY APPARATUS AND METHOD OF CONTROLLING THE DRIVING OF THE VIDEO IMAGE DISPLAY APPARATUS

(75) Inventor: Makiko Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1875 days.

(21) Appl. No.: 10/207,139

(22) Filed: Jul. 30, 2002

(65) Prior Publication Data

US 2003/0025718 A1 Feb. 6, 2003

(30) Foreign Application Priority Data

Aug. 1, 2001 (JP) ................ 2001-234137

(51) Int. Cl.
G09G 5/10 (2006.01)
(52) U.S. Cl. ............ 345/690; 345/204; 345/589; 345/617
(58) Field of Classification Search ........ 345/87–100, 345/204, 77, 690, 63, 426, 589, 617; 382/272, 382/274; 348/221.1
See application file for complete search history.

(56) References Cited

U.S. PATENT DOCUMENTS 6,337,695 B1 * 1/2002 Bang .............. 345/690

2001/0000217 A1 4/2001 Ono et al. ............... 348/380

FOREIGN PATENT DOCUMENTS

| EP | 0 386 983 | A2 | 9/1990 |
| EP | 0 965 974 | A1 | 12/1999 |
| EP | 0 973 331 | A1 | 1/2000 |
| EP | 1 026 655 | A1 | 8/2000 |
| JP | 8-223507 | | 8/1996 |
| JP | 409222871 | A * | 8/1997 |
| JP | 10-268832 | | 10/1998 |
| JP | 2000-250463 | | 9/2000 |

OTHER PUBLICATIONS

Nov. 28, 2005 European Search Report in European Patent Application No. 02017145.0.
Patent Abstracts of Japan, vol. 2000, No. 12, Jan. 3, 2001 (JP-A 2000-250463, Sep. 14, 2000).
Patent Abstracts of Japan, vol. 1996, No. 12, Dec. 26, 1996 (JP-A 8-223507, Aug. 30, 1996).
Mar. 17, 2008 European Official Action in European Patent Appln. No. 02017145.0.

* cited by examiner

*Primary Examiner*—Abbas I Abdulselam
(74) *Attorney, Agent, or Firm*—Fitzpatrick, Cella, Harper & Scinto

(57) ABSTRACT

In a drive control device 30 for controlling the driving of a display apparatus 20 that displays a video image on the basis of an input video image signal S1 (or S2), there is provided brightness control means (33, 21, 7) for controlling a display brightness in the display apparatus 20 in accordance with brightness information S6 corresponding to the mean brightness of the video image, and the brightness control means (33, 21, 7) performs a control operation so that the display brightness of the video image display variably changes a plurality of times within respective one-frame scanning periods of the video image display.

18 Claims, 12 Drawing Sheets

DRIVE CONTROL DEVICE FOR A DISPLAY APPARATUS, VIDEO IMAGE DISPLAY APPARATUS AND METHOD OF CONTROLLING THE DRIVING OF THE VIDEO IMAGE DISPLAY APPARATUS

BACKGROUND OF THE INVENTION

1. Field of the Invention

The present invention relates to a drive control device for a display apparatus used in a video imaged is play apparatus such as a television picture reproducing device or a monitor for a computer, and more particularly to a drive control device for a display apparatus which realizes an ABL (automatic brightness limiter) or a function corresponding to the ABL.

2. Description of the Related Art

Some video image display apparatuses have an ABL (automatic brightness limiter) for limiting display brightness. Typically, the ABL conducts a control operation so that a mean display brightness of a screen is not too high for the purpose of suppressing power consumption or the like. A conventional CRT display apparatus is normally equipped with a CRT anode current detection type ABL circuit, which is made up of an analog circuit.

On the other hand, there is an ABL in a self-light-emission type flat panel display apparatus using a method that processes an analog video image signal that is input to a PDP, as described in JP 10-268832 A. Also, digitization of ABL control is disclosed in, for example, JP 2000-250463 A.

The conventional digital ABL control operation adjusts the brightness every one-frame scanning period.

Therefore, in the case where the setting resolution of a brightness control value which is a parameter for adjustment of brightness is coarse, a user feels visual annoyance from a change in the brightness of the overall screen caused by the ABL control in a video image having a mean brightness gently changed between a plurality of successive frames or a video image having the brightness of a part of a screen changed.

Under the above circumstances, in order to prevent the visual annoyance, a variation of the brightness control value has been intentionally reduced so as to smoothly change the brightness. However, in the video image whose mean brightness increases or decreases monotonously over a plurality of frames, a change in the brightness control value does not follow a change in the mean brightness. Therefore, even if there is no change in the mean brightness of an input video image, the brightness control value continues to change, with the result that the user feels strangeness.

This phenomenon will be described with reference to FIGS. 12A to 12C. FIG. 12A is a graph showing an example of the mean brightness of the input video images, which monotonously increases and is then stabilized. A brightness reference value, which is a desired upper limit of a display mean brightness is indicated by a dotted line and set in advance.

FIG. 12B is a graph showing a change of the brightness control value over time, which corresponds to the video image shown in FIG. 12A. A desired value of the brightness control value (a brightness suppression coefficient in this example) is indicated by a solid line, and in order to prevent visual annoyance, a variation of the brightness control value between the respective frames is suppressed so as to be small, and therefore the brightness suppression coefficient that is actually output is indicated by a broken line.

FIG. 12C is a graph showing a change in the mean brightness displayed as a result of operating the ABL over time. A portion where the solid line and the broken line are apart from each other in FIG. 12B is a time zone where the suppression of the brightness does not follow the change in the brightness, and after the mean brightness of the input image has been stabilized, the brightness that has exceeded the brightness reference value is gradually suppressed and then brought into agreement with the brightness reference value. It has been found that this is a factor that gives the user visual strangeness.

SUMMARY OF THE INVENTION

The present invention has been made to solve the above drawbacks with the related art, and therefore an object of the present invention is to provide a drive control device for a display apparatus, a video image display apparatus and a drive control method which have a digitized ABL or a function corresponding to the digitized ABL.

Another object of the present invention is to provide a drive control device for a display apparatus, a video image display apparatus and a drive control method, which change a display brightness at a plurality of timings within respective frames to suppress an increase in power consumption and heating of a display surface and do not cause visual annoyance or strangeness.

In one aspect, the present invention resides in a drive control device for controlling the driving of a display apparatus that displays a video image on the basis of an input video image signal, where the device comprises brightness control means (controller) for controlling a display brightness in the display apparatus in accordance with brightness information corresponding to a mean brightness of the video images, and the brightness control means conducts control so that the display brightness of the video image variably changes a plurality of times within respective one-frame scanning periods for displaying of the video image.

In another aspect the present invention resides in a video image display apparatus having a display apparatus that displays a video image on the basis of an input video image signal, where the video image display apparatus comprises a mean brightness detecting unit that obtains brightness information corresponding to a mean brightness of the video images, a control unit that outputs a brightness control value in accordance with the brightness information obtained from the mean brightness detecting unit, and adjusting means (or an adjusting unit) for adjusting a display brightness in accordance with the brightness control value that is output from the control unit, where the control unit variably changes the brightness control value so as to variably change the display brightness of the video image a plurality of times within respective one-frame scanning periods for displaying the video image.

In yet another aspect, the present invention resides in a drive control method for controlling the driving of a display apparatus that displays a video image on the basis of an input video image signal, where a display brightness in the display apparatus is controlled in accordance with brightness information corresponding to a mean brightness of the video images, and where the display brightness of the video image is controlled to variably change a plurality of times within respective one-frame scanning periods for displaying the video image.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings. It should be noted that the scope of the present invention is not limited to the dimensions, materials, configurations, relative arrangement, and so on of the structural elements described in the embodiments so far as a specific description is not given in particular.

First Embodiment

Figure 1:
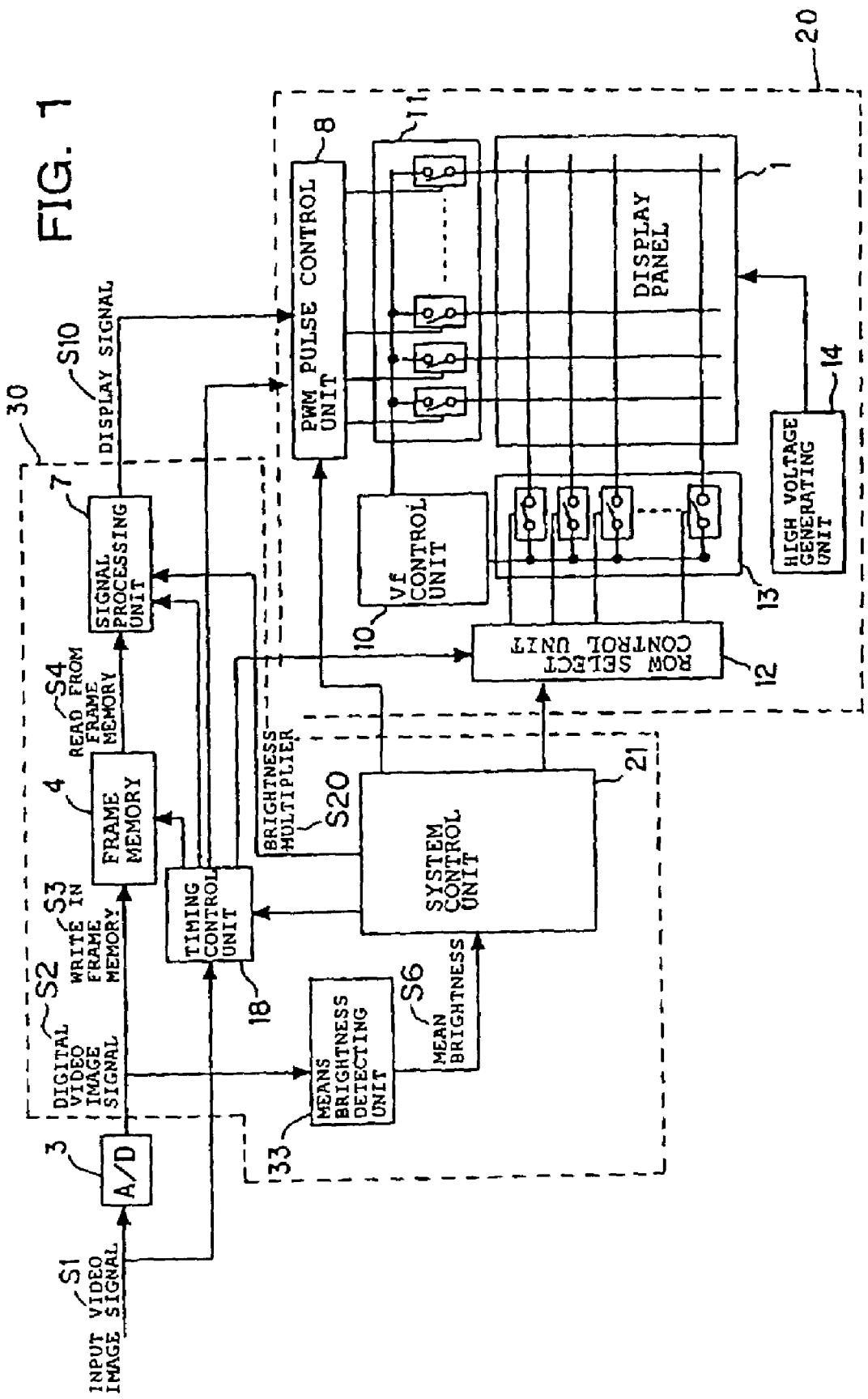
FIG. 1 is a diagram showing the structure of a video image display apparatus in accordance with a first embodiment.

FIG. 1 shows the structure of a video image display apparatus in accordance with a first embodiment.

Referring to FIG. 1, reference numeral 1 denotes a display panel, and in this embodiment, there is employed a display panel including a large number of electron sources on a substrate, for example, multiple electron sources having surface conduction type cold cathode elements arranged therein and an image forming member that forms an image by irradiating electrons, which are opposed to each other.

Surface conduction type electron emitting elements are wired in a simple matrix by row-directional wiring electrodes and column-directional wiring electrodes, and electrons emitted from an electron emitting element selected by a column/row electrode bias are accelerated by a high voltage so as to be made to collide with phosphors, to thereby emit a light.

The structure of the display panel and a display panel manufacturing method are disclosed in detail in JP 2000-250463 A, for example.

Reference numeral 3 denotes an A/D converter that converts an input analog video image signal to a digital video image signal. Reference numeral 4 denotes a frame memory that stores a video signal for one frame. Reference numeral 7 denotes a signal processing unit that subjects the video image signal to video image signal processing that changes a mean brightness of the original video signal such as brightness/chromaticity adjustment, gamma processing, contour-enhancing processing, or a character information synthesis.

Reference numeral 8 denotes a PWM pulse control unit that converts a digital display signal to a drive signal adaptive to the display panel 1 for a pulse-width modulation. Reference numeral 10 denotes a Vf control unit that supplies a reference voltage for driving elements arranged on the display panel 1. Reference numeral 11 denotes a column wiring switch unit which is made up of switch means such as a transistor and applies a column select voltage from the Vf control unit 10 to the panel column electrode only during the period of a PWM pulse output from the PWM pulse control unit 8 for each horizontal scanning period (row select periods). Reference numeral 12 denotes a row select control unit that generates a row selection pulse that drives the elements on the display panel 1. Reference numeral 13 denotes a row wiring switch unit which is made up of switch means such as a transistor and outputs a row select signal voltage applied from the Vf control unit 10 to a row selected by the row select control unit 12 to the display panel 1. In this way, the drive voltage resulting from synthesizing the row select signal voltage and the column select voltage is applied to the electron emitting elements that constitute pixels, and electrons are emitted only during the PWM pulse period. Reference numeral 14 denotes a high voltage generating unit that applies an anode voltage to a common electrode (an anode electrode) at the substrate side where phosphors are disposed. This voltage becomes an accelerating voltage that accelerates the electrons emitted from the electron emitting elements so as to collide with the phosphors.

Reference numeral 18 denotes a timing control unit that outputs various timing signals for the operation of the respective blocks. Reference numeral 21 denotes a system control unit that includes a built-in micro computer and functions as control means that controls the operation of the respective blocks. Reference numeral 33 denotes a mean brightness detecting unit for detecting brightness information corresponding to the mean brightness of the video images. In this example, a mean brightness S6 of an input video image signal, which is detected using a low pass filter or an integrator as the brightness information, that is, a so-called APL, is employed.

A signal S1 is an analog input video image signal. A signal S2 is a digital video image signal. A signal S3 is a digital video image signal that is written in the frame memory. A signal S4 is a digital video image signal read from the frame memory. A signal S6 is a mean brightness of a video image for one frame, which is calculated, by the mean brightness detecting unit. A signal S10 is a digital display signal processed by the signal processing unit.

In the normal video image display operation, the input video image signal S1 is digitized at a required number of gradations by the A/D converter 3 so as to be converted to the digital video image signal S2, and the digital video image signal S2 is transmitted to the signal processing unit 7 after the digital video image signal S2 first has been stored in the frame memory 4. The digital display signal S10 that has been subjected to brightness/chromaticity adjustment, gamma processing, contour emphasizing processing, character information synthesis of the video image signal by the signal processing unit 7 is serial/parallel-converted every one cycle (row select period) corresponding to the horizontal scanning period by the PWM pulse generating unit 8 and then PWM-modulated for each of the columns. The PWM-modulated pulse is output to a column drive output SW unit 11.

The row selection of the display panel 1 is conducted by allowing the row select control unit 12 to output a select pulse to the row drive output SW unit 13 on the basis of signals resulting from sequentially shifting start pulses set at heads of the horizontal effective display periods for each of the horizontal scanning periods (row select periods).

Figure 2:
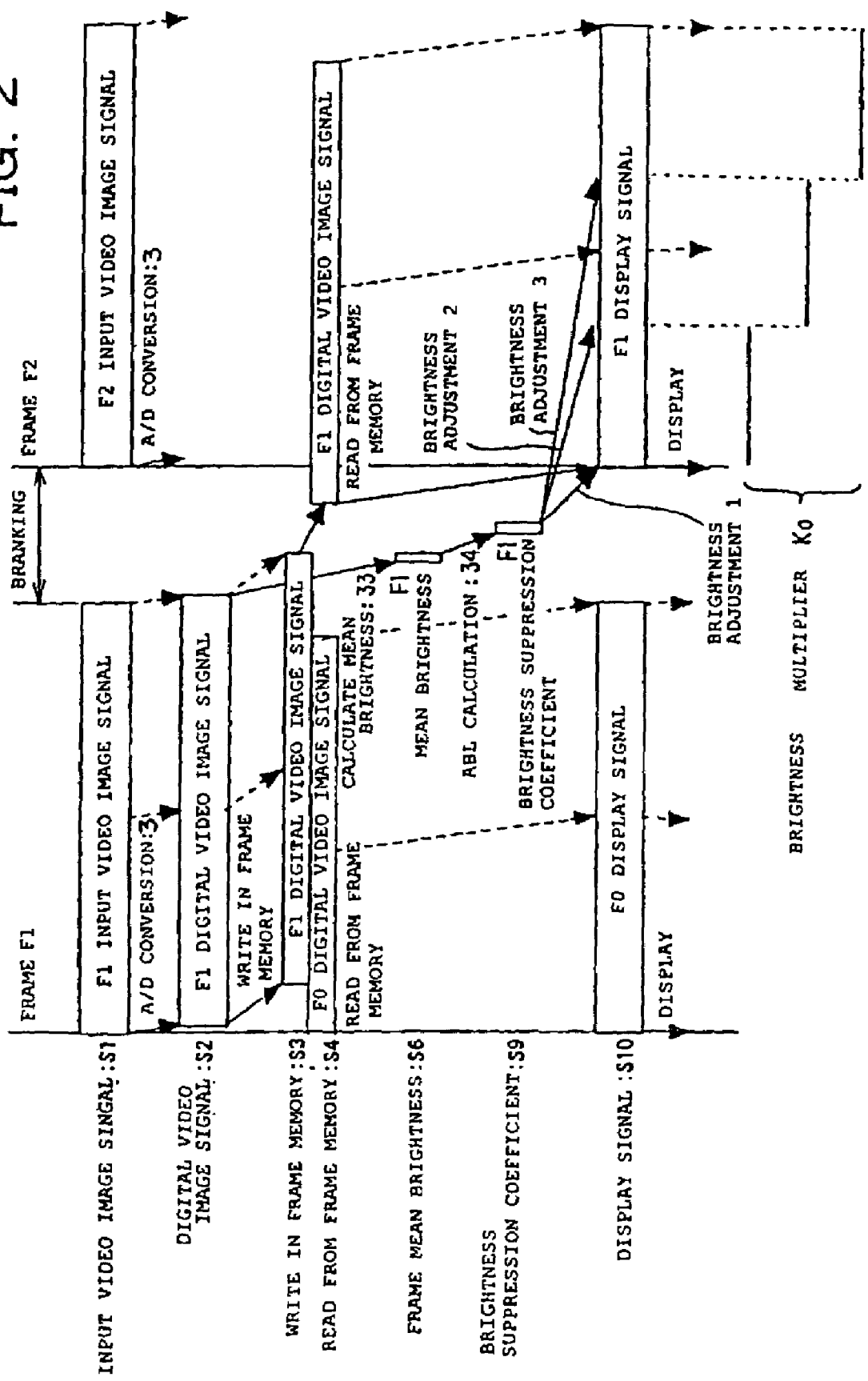
FIG. 2 is a data flowchart showing a process corresponding to a data flow at the time of conducting an ABL process.

FIG. 2 is a data flow for explaining a process corresponding to a flow of data when ABL processing is conducted in this embodiment. In FIG. 2, the axis of ordinate represents the flow of data and the axis of abscissa is time. Hereinafter, the processing will be described with reference to FIGS. 1 and 2.

The analog input video image signal S1 is digitized by the A/D converter 3 so as to be converted to the digital video image signal S2. The mean brightness S6 of the frame is calculated by the mean brightness detecting unit 33 simultaneously when the digital video image signal S2 is written into the frame memory 4 (S3).

The mean brightness S6 is input to the system control unit 21 that functions as control means, and a brightness control value is output from the system control unit 21. For example, in this embodiment, a brightness suppression coefficient for adjusting the light emission brightness of the display panel 1 in accordance with the mean brightness of the video images is calculated. The coefficient is calculated so as to have such a relationship that the light emission brightness of the display panel 1 is made low if the mean brightness of the video images is high. Then, the system control unit 21 sets the brightness multiplier corresponding to the brightness suppression coefficient with respect to the signal processing unit 7. In this situation, the brightness multiplier is appropriately altered at a plurality of timings in accordance with a variation from the brightness multiplier that has been previously set in the halfway of the frame.

FIG. 2 shows a case in which the set brightness multiplier varies in 3 steps. The brightness multiplier that changes step by step is set in the signal processing unit 7 at a plurality of timings where a period of one frame is divided into substantially three equal units as the brightness adjustments 1 to 3.

The signal processing unit 7 functions as adjusting means and subjects the video image signal S4 read from the frame memory in accordance with the brightness multiplier to arithmetic operation to generate the display signal S10, to thereby adjust the display brightness of the display panel 1.

The display signal S10 is converted into a drive signal that permits the display panel 1 to be driven by the PWM pulse control unit 8, and the display panel 1 is driven to display the video image.

A method of determining the brightness suppression coefficient of the light emission brightness of the display panel 1 will be exemplified.

Figure 3:
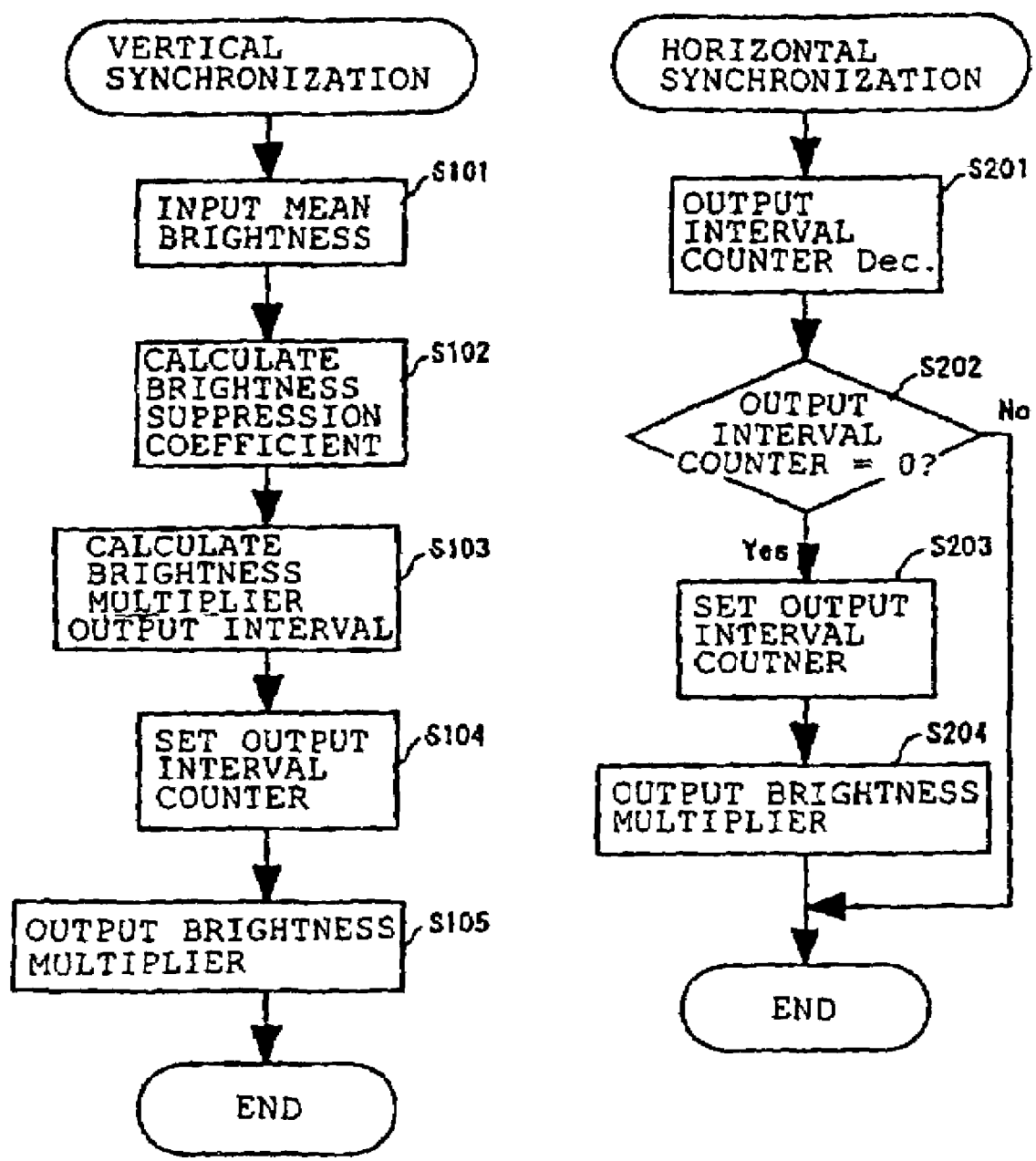
FIG. 3 is a flowchart for explaining the processing of a system control unit.

A flow chart of a calculation processing program which is executed by arithmetically operating means, for example, a microcomputer which is equipped in the system control unit 21, is shown in FIG. 3. This processing starts in synchronism with a vertical synchronous signal that is synchronous with a one-frame scanning period (which also includes the meaning of one field scanning period) which is supplied from the timing control unit 18 and a horizontal synchronous signal that is synchronous with a one-horizontal scanning period and is terminated within the vertical and horizontal retrace interval.

Figure 4:
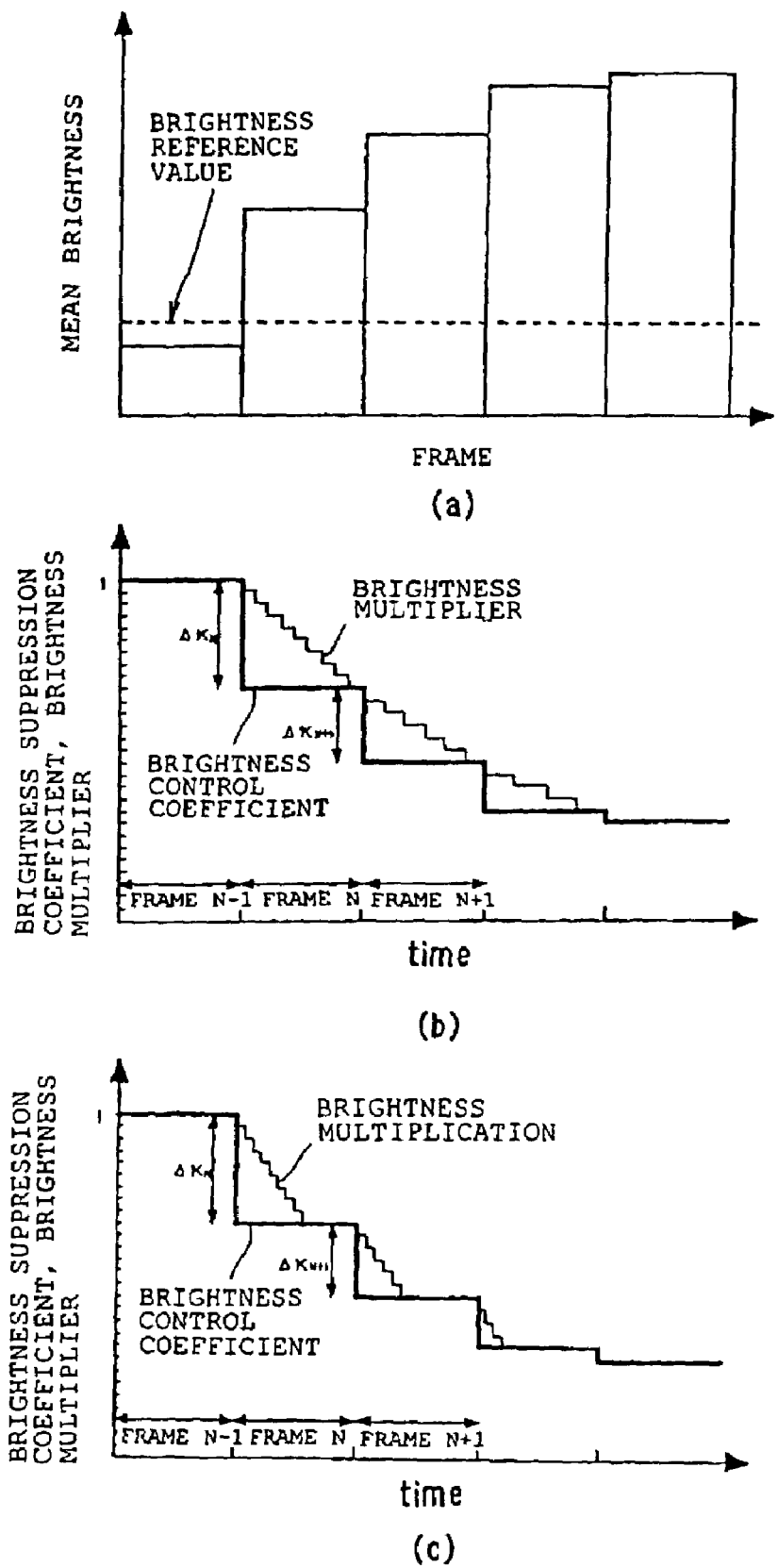
FIGS. 4A to 4C are graphs for explaining an example of a brightness control in the first embodiment.

In the processing at the time of the vertical synchronization, the mean brightness S6 of the input video image which is calculated by the mean brightness detecting unit 33 is first input in step S101. FIG. 4A is a graph showing an example of a change in the mean brightness S6. Since the mean brightness is detected for each of the frames, the mean brightness takes a discrete value. The brightness reference value which is a desired upper limit of the display mean brightness is indicated by a broken line, and the brightness reference value is a value which is set in advance as the specification of the video image display apparatus.

In step S102 of FIG. 3, the brightness suppression coefficient is calculated. Assuming that the mean brightness of the present frame is B(t) and the brightness reference value is Bm, the brightness suppression coefficient K(t) in the present frame is represented by expression 1.

$K(t)=Bm/B(t)$ (in case of $B(t)>Bm$)

$K(t)=1$ (in case of $B(t){\leq}Bm$)  (Ex. 1)

The brightness suppression coefficient K(t) is 1 when the mean brightness B(t) is smaller than the brightness reference value Bm, and the brightness suppression coefficient K(t) becomes smaller as the mean brightness is higher.

Also, the brightness suppression coefficient K(t) may be obtained by using the following expression 2 provided that a gain G ($0{\leq}G{\leq}1$) is determined so as to enhance the stability of the ABL control.

$K(t)=(\text{MIN}(Bm/B(t),1)-K(t-1)){\times}G+K(t-1)$  (Ex. 2)

Where K(t−1) is the brightness suppression coefficient obtained in the previous frame, and MIN (a, b) is a function that returns a smaller value of a and b.

In FIG. 4B, the brightness suppression coefficient K(t) corresponding to FIG. 4A is indicated by a heavy line.

Then, in step S103 of FIG. 3, an output interval of the brightness multiplier is calculated in step S103 of FIG. 3. The output interval C is represented by expression 3 assuming that the number of display rows of the display panel 1 is Yn, and the setting resolution of the brightness multiplier is δ.

$C=Yn{\times}\delta/abs(K(t)-K(t-1))$  (Ex. 3)

In this case, abs(x) is a function that returns the absolute value of x. Then, the output interval C is stored in an output interval counter in step S104.

In step S105, a brightness multiplier Ko is output to the signal processing unit 7. A desired brightness multiplier value K'(t) is merely converted into a value which is proportional to the brightness suppression coefficient K(t) and makes bit expression or the like meet with the limit of hardware, and the desired brightness multiplier value K'(t) is represented by expression 4.

$K'(t)=K(t)/\delta$  (Ex. 4)

For example, in the case where the brightness multiplier Ko is a digital value of 8 bits and expresses 0 to 1 times, the setting resolution δ is 1/255. That is, the desired brightness multiplier value K'(t) is 255 (FFh) when the brightness suppression coefficient K(t) is 1 times, and the desired brightness multiplier value K'(t) is 204 (CCh) when the brightness suppression coefficient K(t) is 0.8 times.

In this case, the output brightness multiplier Ko is obtained by expression 5 from the desired brightness multiplier value K'(t) of the present frame obtained by expression 4 and the brightness multiplier Kn now set:

$Ko=Kn+1$ (in case of $K'(t)>Kn$)

$Ko=Kn-1$ (in case of $K'(t)>Kn$)

$Ko=Kn$ (in case of $K'(t)=Kn$)  (Ex. 5)

In other words, the brightness multiplier Ko changes by the settable minimum unit to complete the vertical synchronous processing. Also, in case of K'(t)=Kn, a process of outputting the brightness multiplier Ko may be skipped.

In the processing during the horizontal synchronization, the output interval counter set in step S104 is decremented in step S201, and it is judged in step S202 whether the output interval counter became zero, or not. If the output interval counter is not zero, since no processing is conducted at this timing, the processing is terminated. If the output interval counter is zero, the processing goes to step S203, and the output interval counter is reset to a value obtained in step S103 as in step S104.

Then, in step S204, the brightness multiplier Ko obtained in expression 5 is output to the signal processing unit 7 as in step S105, and the processing is terminated.

A thin line in FIG. 4B is a graph showing a change in the brightness multiplier Ko. The scale of the axis of ordinate represents the setting resolution of the brightness multiplier, and the scale of the axis of abscissa is the boundary of the frames.

In a frame N−1, as shown in FIG. 4A, the brightness suppression coefficient is 1 since the mean brightness B(t) is the brightness reference value Bm or less. In a frame N, since the mean brightness B(t) exceeds the brightness reference value Bm, the brightness suppression coefficient K(t) becomes a value indicated by a heavy line in FIG. 4B by expression 1 or 2.

In this situation, since a difference $\Delta K_N$ between the brightness suppression coefficient K(N−1) in the frame N−1 and the brightness suppression coefficient K(N) in the frame N corresponds to 9 setting resolutions of the brightness multiplier (the scale in the axis of ordinate), the output interval C of the brightness multiplier becomes Yn/9 times of the horizontal synchronization with setting the number of display rows of the display panel 1 as Yn. If the output interval C cannot be divided, rounding up/down is conducted. When the brightness multiplier Ko changes step by step at that interval, the brightness suppression coefficient reaches the desired brightness suppression coefficient K(N) during the frame N.

In the subsequent frame N+1, since the inter-frame difference $\Delta K_{N+1}$ of the brightness suppression coefficient corresponds to 6 setting resolutions of the brightness multiplier, the output interval C of the brightness multiplier becomes Yn/6 times of the horizontal synchronization. Thereafter, the same operation is conducted.

As a result, since the brightness multiplier Ko variably changes a plurality of times during respective one-frame scanning periods, the video image display also more smoothly changes as compared with the case of the conventional digital ABL control, thereby preventing visual annoyance or strangeness.

It is desirable that the setting resolution δ of the brightness multiplier is at a level where one-step change cannot be recognized visually, and specifically, the setting resolution may correspond to the resolution of the display image data.

In this embodiment, a display apparatus using a cold cathode element as the electron source is described, however, this embodiment is also applicable to a display panel such as a PDP, an LCD, a CRT or an electro luminescent (EL). For example, in the case where the display apparatus is applied to a display panel such as a PDP, an LCD, a CRT, an EL or the like, the display apparatus module 20 may be replaced by a PDP module or an LCD module or the like.

As described above, according to the present invention, in the drive control device 30 for controlling the driving of the display apparatus 20 that displays the image on the basis of an input video image signal S1 (or S2), there is provided brightness control means (33, 21, 7) for controlling the display brightness of the display apparatus 20 in accordance with the brightness information S6 corresponding to the mean brightness of the video images, and the brightness control means (33, 21, 7) conducts the control operation so that the display brightness of the video image display variably changes a plurality of times within respective one-frame scanning periods of the video image display.

As a result, even in a video image that is monotonously brightened, the video image can be displayed without causing strangeness. That is, it is possible to conduct digital ABL processing that reduces visual annoyance or strangeness.

Also, according to this embodiment, the brightness control means (33, 21, 7) enables effective digital ABL processing by the mean brightness detecting unit 33 that obtains the brightness information, the control unit 21 that outputs the brightness control value Ko in accordance with the brightness information S6 obtained by the mean brightness detecting unit 33, and the adjusting means (7) that adjusts the display brightness in accordance with the brightness control value Ko output from the control unit 21.

In addition, since the control for changing the display brightness Ko is synchronized with the horizontal synchronous signal, a still less strange video image can be displayed.

In addition, since a timing at which the display brightness changes is determined in accordance with a difference in the mean brightness between the successive frames, and a one-frame scanning period is divided into substantially equal times, control is more finely conducted.

Also, since control is made so as to change the brightness component of the digitalized video image signal in order to change the display brightness, there can be provided a drive control device that does not depend on the type of the display apparatus module 20 and is high in general purpose.

Since the control unit 21 that functions as the brightness control means is made up of a microcomputer that executes a program that calculates the brightness control value for adjusting the display brightness, the circuit scale can be downsized.

Hereinafter, other embodiments of the present invention will be described in more detail.

Second Embodiment

In the first embodiment, the output interval of the brightness multiplier is calculated on the basis of the expression 3 from the inter-frame difference of the brightness suppression coefficient, however, in this embodiment, the output interval C of the brightness multiplier is set to a predetermined constant value.

A thin line in FIG. 4C is a graph showing a change in the brightness multiplier Ko in the case where the output interval C of the brightness multiplier is Yn/16 in correspondence with FIG. 4A. In this embodiment, since a timing at which the brightness multiplier changes is concentrated in the front half of the one-frame scanning period, the arrival at the brightness multiplier which is desired, that is, the desired brightness multiplier value K'(t) becomes quick.

Other matters are identical with those in the first embodiment, and the flowchart of FIG. 3 is identical with that of the first embodiment except that the brightness multiplier output interval calculation in step S103 is not required.

According to this embodiment, since the timing at which the display brightness changes has a constant time interval, it is unnecessary to conduct the division processing of the output interval C of the brightness multiplier for each of the frames, and a load on the system control unit 21 is reduced, and the brightness multiplier Ko is stabilized at an earlier time.

This embodiment has another variation. The output interval C of the brightness multiplier can be set to predetermined values which gradually lengthen overtime from the short value at the beginning within a one-frame scanning period. As a result, response of the brightness multiplier has not a linear but a curved profile, like the response by an analog circuit.

By using digital ABL, another arbitrary response profile can be designed.

Third Embodiment

In this embodiment, in the case where the mean brightness of the display screen is high, the power consumption becomes large so as to apply a load onto the high-voltage generating unit 14, and therefore a response speed of the ABL is going to be made high, depending on the characteristics of the video image display apparatus. However, in the case where the brightness is low, in particular, when it is unnecessary that the response speed of the ABL is high, this embodiment is preferred. In this case, a time constant is set to different values between a time when the brightness suppression coefficient is increased and a time when the coefficient is decreased, to thereby control a period of time where the brightness multiplier value reaches the desired brightness multiplier value K'(t).

In this case, a time constant is set to different values between a time when the brightness suppression coefficient is increased and a time when the coefficient is decreased, to thereby control a period of time where the brightness multiplier value reaches the desired brightness multiplier value K'(t).

In this embodiment, the gain G in the expression 2 changes over in accordance with the circumstances as in the above-mentioned embodiment. Specifically, the gain when the brightness suppression coefficient is increased is set to Gu, and the gain when the brightness suppression coefficient is decreased is set to Gd. Expression 6 is applied in accordance with a relationship in magnitude between B(t) of the mean brightness of the present frame and B(t−1) of the mean brightness of the previous frame.

$G=Gu$ (in case of $B(t)>B(t-1)$)

$G=Gd$ (in case of $B(t) \leq B(t-1)$)  (Ex. 6)

Where Gu<Gd.

As a result, the present-frame brightness suppression coefficient K(t) is calculated by using the expression 2.

According to this embodiment, control is made so that the display brightness reaches the desired display brightness quicker in the case where the mean brightness is large than that in the case where the mean brightness is small. In other words, since the time constant differs between a case where the brightness suppression coefficient increases and a case where the brightness suppression coefficient decreases, the change in the brightness multiplier is optimized, thereby being capable of effectively preventing the visual annoyance and strangeness.

Fourth Embodiment

Figure 5:
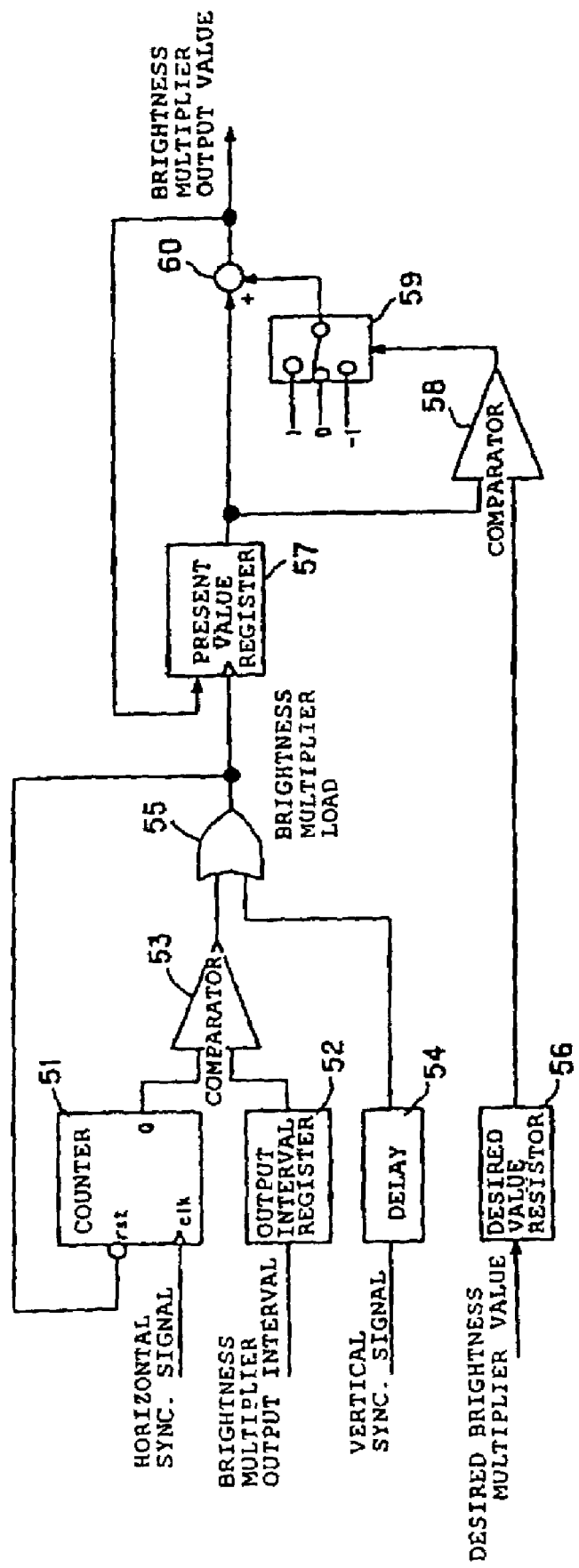
FIG. 5 is a diagram showing the structure of a video image display apparatus in accordance with a fourth embodiment.

In the first and second embodiments, the processing in the horizontal synchronization is conducted by the system control unit 21 in software fashion but can be conducted in hardware fashion. A block diagram of a logic circuit related to the brightness multiplier output of the system control unit 21 is shown in FIG. 5.

The desired brightness multiplier value K'(t) and the brightness multiplier output interval C are stored in the desired value register 56 and the output interval register 52 through the above-mentioned processing in the vertical synchronization, respectively. The counter 51 is input with the horizontal synchronous signal as a clock and operates as an up-counter. The counter value is input to a comparator 53 and compared with a value stored in the output interval register 52, and a signal output from the comparator 53 when the counter value and the stored value are equal to each other and a signal resulting from delaying the vertical synchronization signal by a processing period of time of the above-mentioned vertical synchronization by a delay circuit 54 are OR processed by an OR circuit 55 which is set as a brightness multiplier load signal for reading the brightness multiplier Ko.

The brightness multiplier load signal is input to a present-value register 57 as a clock signal, and the brightness multiplier output value that is an output of an adder 60 is loaded. The output of the present-value register 57 and the output of the desired-value register 56 are input to a comparator 58, and a signal that selects +1 when the desired value is larger, −1 when the desired value is smaller and 0 when the desired value and the present value are equal to each other is output to a switch 59 from the comparator 58. The output of the switch 59 is added to the output of the present-value register 57 by an adder 60 and then set as the brightness multiplier output value with respect to the signal processing unit 7.

According to this embodiment, since the brightness multiplier equal to that in FIG. 4B is obtained, the same effects as those in the first embodiment are obtained.

Then, according to this embodiment, since the brightness control means includes a signal processing circuit specific to calculation of the brightness control value, a load on the control unit 21 can be reduced and the processing speed can be enhanced.

In this embodiment, when a dot clock signal is input to a counter 51 instead of the horizontal synchronous signal, and the brightness multiplier output interval is set to a one-dot interval (one-pixel interval), a control signal for changing the display brightness is synchronized with the dot clock signal. In this way, the brightness multiplier changes every dot, thereby being capable of more finely conducting digital ABL control.

Fifth Embodiment

Figure 6:
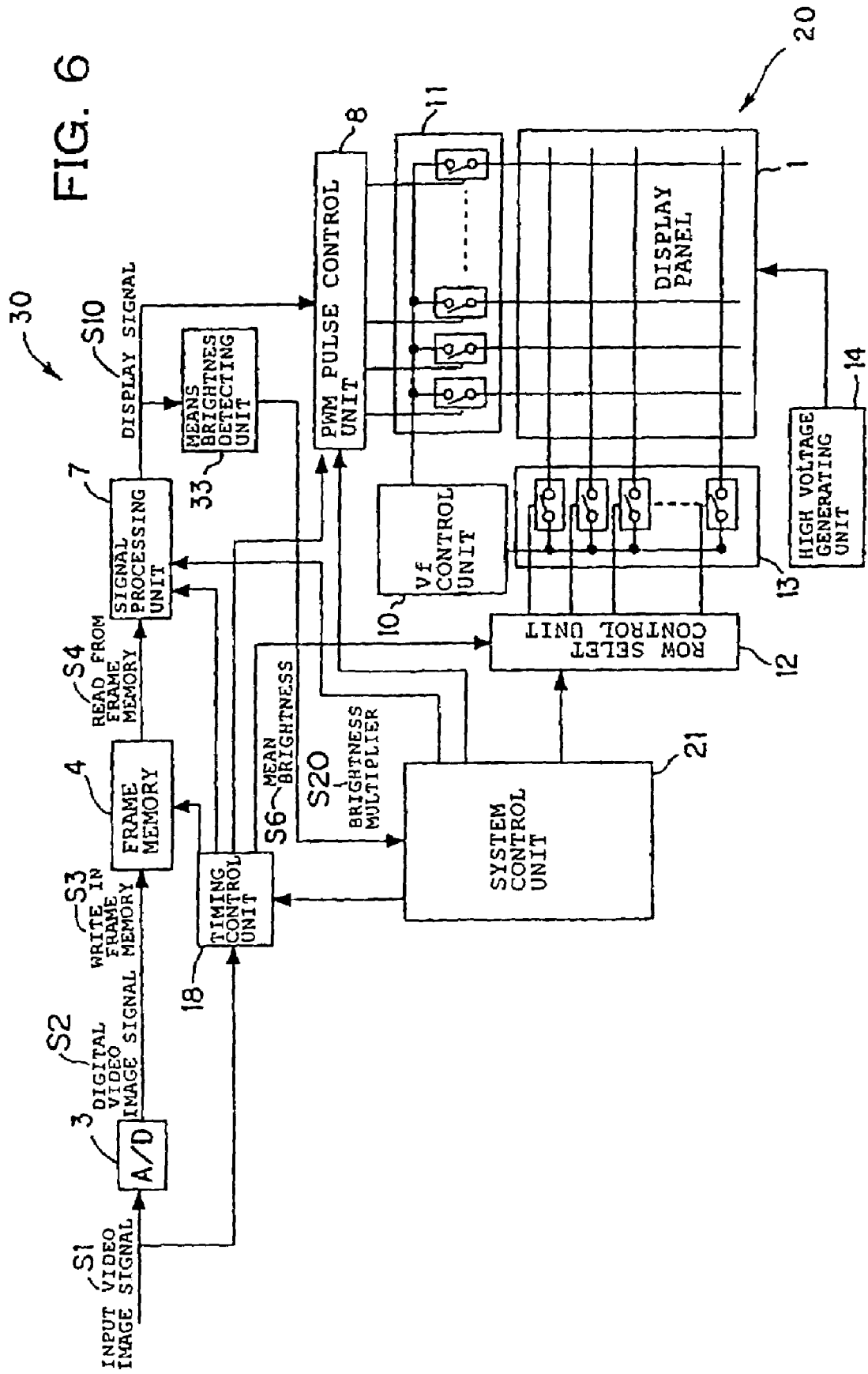
FIG. 6 is a diagram showing the structure of a video image display apparatus in accordance with a fifth embodiment.

FIG. 6 shows the structure of a video image display apparatus in accordance with a fifth embodiment. In FIG. 6, the same parts as those in FIG. 1 are designated by identical references and their description will be omitted.

In the first embodiment, the mean brightness S6 is calculated from the digital video image signal S2 immediately after the input signal S1 has been converted by the A/D converter 3 to a digital signal (digitized). However, in this embodiment, the mean brightness is calculated from a digital display signal 510 after the signal input signal S1 has been subjected to brightness/chromaticity adjustment, gamma processing, contour emphasizing process, character information synthesis and so on, and is then input to the system control unit 21.

In this embodiment, the calculation expression of the brightness suppression coefficient K(t) is represented by expression 7 instead of expression 1 because of a feedback control.

$$K(t)=\text{MIN}(Bm \times K(t-1)/B(t), 1) \quad \text{(Ex. 7)}$$

Where B(t) is a frame mean brightness value of the display signal S10 which is output from the signal processing unit 7. The other matters are identical with those in the first or the second embodiment.

In a device having a linear light emitting characteristic with respect to the display image signal, it is desirable to conduct reverse γ transformation with respect to the γ-characteristic of the CRT within the signal processing unit 7 with the result that the mean brightness level of the display signal which is given to the display panel in fact largely drops from the mean brightness level of the input video image signal. An error becomes large when the mean brightness level after the reverse γ transformation processing is calculated from the mean brightness level of the input video image signal, however, in this embodiment, since the mean brightness after the reverse γ transformation processing is obtained, accurate control is enabled.

Also, this embodiment is effective for an OSD (on-screen display) where another image signal such as character information is added to an input video image signal. The ratio of a display area of the image signal added in the OSD to the display area of the device is larger. Therefore, a tendency is made to further enlarge a difference between the mean brightness of the original input video image signal and the mean brightness of the video image signals to which the image signal is added, and it is hard to ignore this difference in conducting the ABL processing.

According to this embodiment, since the brightness information is obtained from the video image signal that is subjected to a signal processing that changes the brightness of the input video image signal, the mean brightness can be obtained from the actual video image display signal that takes the gamma transformation and the OSD(on-screen display) into consideration, and thus more accurate control is enabled.

Sixth Embodiment

In the above-mentioned embodiments, a case in which the brightness component of the video image signal is changed as means of controlling the light emission brightness of the display panel was described. However, another method may be employed as the control means of the light emission brightness.

Figure 7:
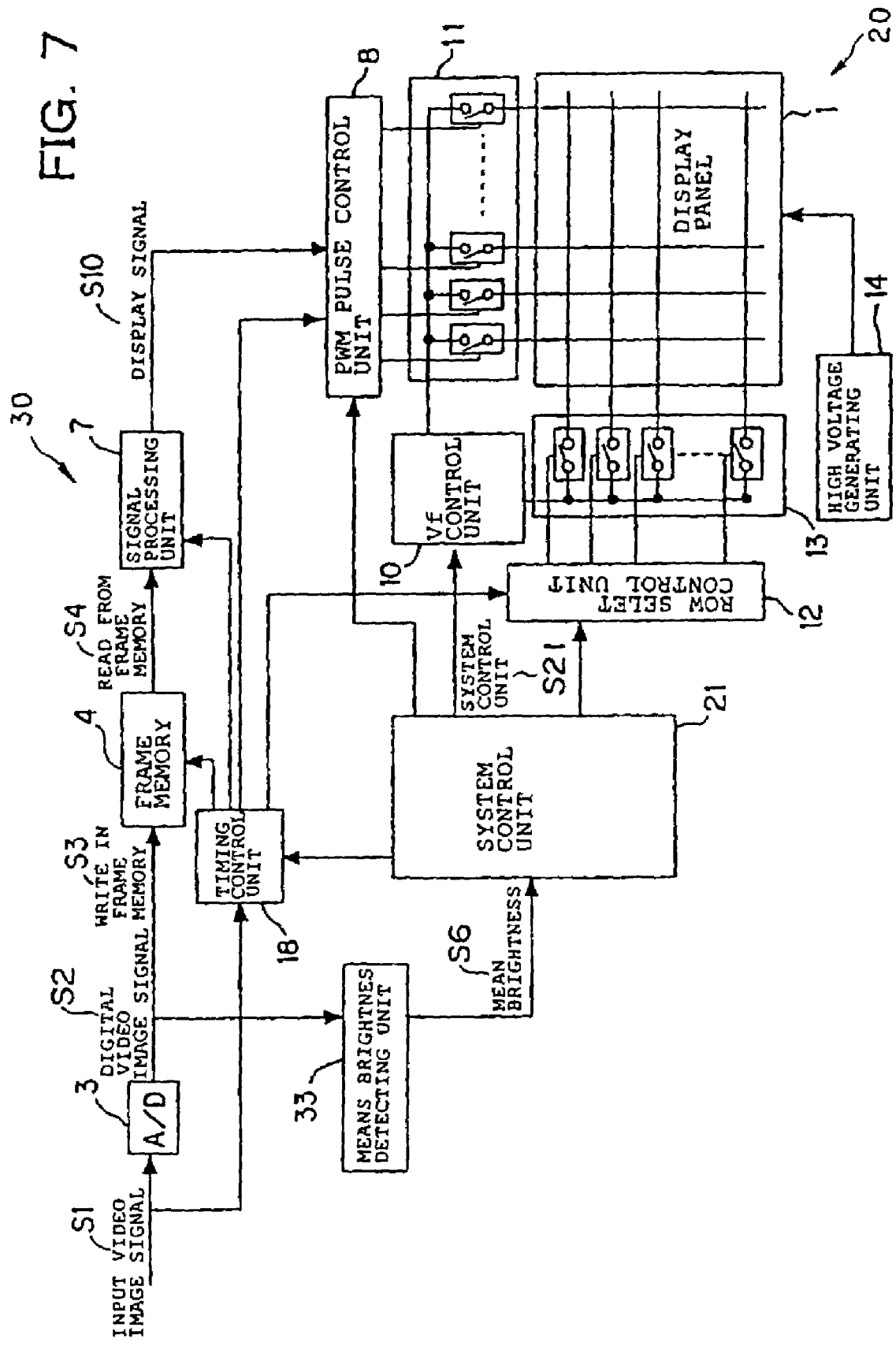
FIG. 7 is a diagram showing the structure of a video image display apparatus in accordance with a sixth embodiment.

In this embodiment, a voltage that drives the electron emitting element on the display panel 1 which is output from the Vf control unit 10 is controlled to control the light emission brightness. FIG. 7 shows the structure of a display apparatus in accordance with this embodiment.

The system control unit 21 sets a Vf adjustment value S21 with respect to the Vf control unit 10.

The Vf control unit 10 outputs a voltage that drives the display panel 1 with the Vf adjustment value S21 as an adjustment value of the voltage that drives the electron emitting element. If a period of time during which the element voltage is applied is constant, because the brightness of the screen changes in accordance with the element voltage Vf as shown in FIG. 8, the drive voltage Vf(t) is determined by using the brightness suppression coefficient K(t) calculated in the expressions 1 and 2 or the expression 7.

The determining method may be, for example, a method that refers to a table, a method that conducts the calculation by using a calculation expression, or the like. In FIG. 8, assuming that a normalized brightness reference value Bm bar is taken, a drive voltage range to be used is a range of from Vf0 to Vf1. When this range is subjected to linear approximation, Vf(t) is obtained from the expression 8.

$$Vf(t)=(K's(t)-\overline{Bm})*(Vf1-Vf0)/(1-\overline{Bm})+Vf0 \quad \text{(Ex. 8)}$$

Figure 8:
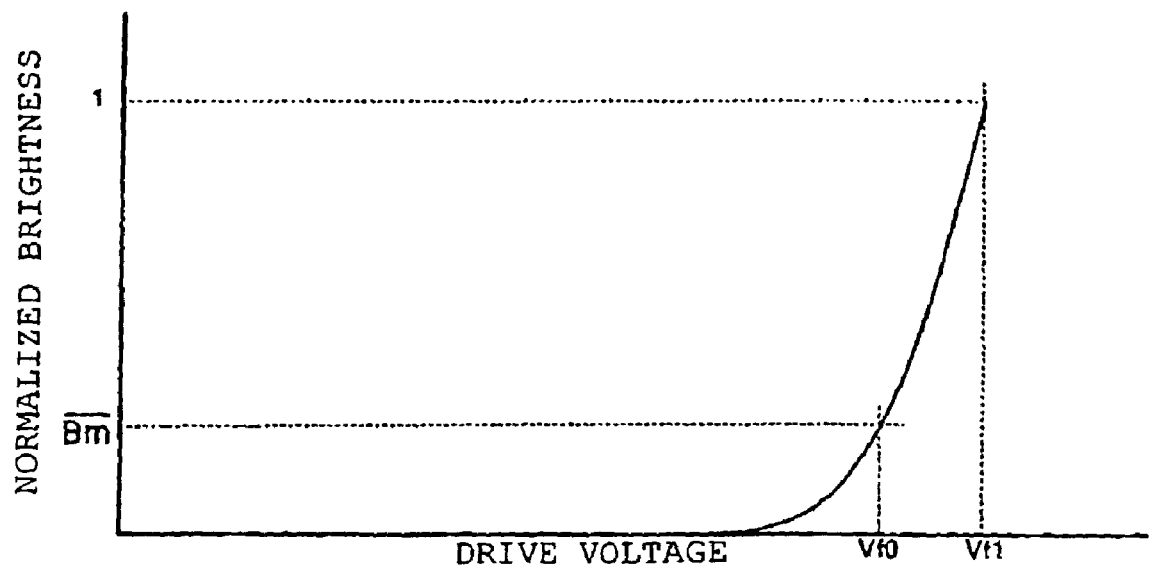
FIG. 8 is a graph showing a typical characteristic of brightness with respect to a drive voltage in a display panel used in the embodiment.

Also, FIG. 8 may be subjected to approximation by a broken line or a higher-order expression without being limited to the linear approximation.

Thereafter, the output interval C of the Vf adjustment value and the Vf adjustment value V(t) that serves as the brightness control value are represented by expression 9 and expression 10 according to expression 3 and expression 4, and the Vf adjustment value is output to the Vf control unit 10.

$$C=Yn \times \delta v/abs(Vf(t)-Vf(t-1)) \quad \text{(Ex. 9)}$$

$$V(t)=Vf(t)/\delta v \quad \text{(Ex. 10)}.$$

In this case, δv is the setting resolution of the Vf adjustment value.

In the case where it is unnecessary to adjust the brightness in a cycle shorter than a cycle of the one horizontal scanning, control may be conducted as described above.

According to this embodiment, since control is made so as to change the drive voltage Vf that is applied to drive the pixels of the display apparatus in order to change the display brightness, it is unnecessary to change the brightness component of the video image display signal in order to control the brightness. Therefore, it is possible to suppress such a phenomenon that the gradation reproducibility is deteriorated in a dark image (or a bright image) when the number of gradations increases. In particular, if the voltage of a scanning select signal that is applied to a selected row changes in accordance with the mean brightness, it is unnecessary to adjust the video image display signal for each of the pixels, to thereby simplify the control.

Seventh Embodiment

Figure 9:
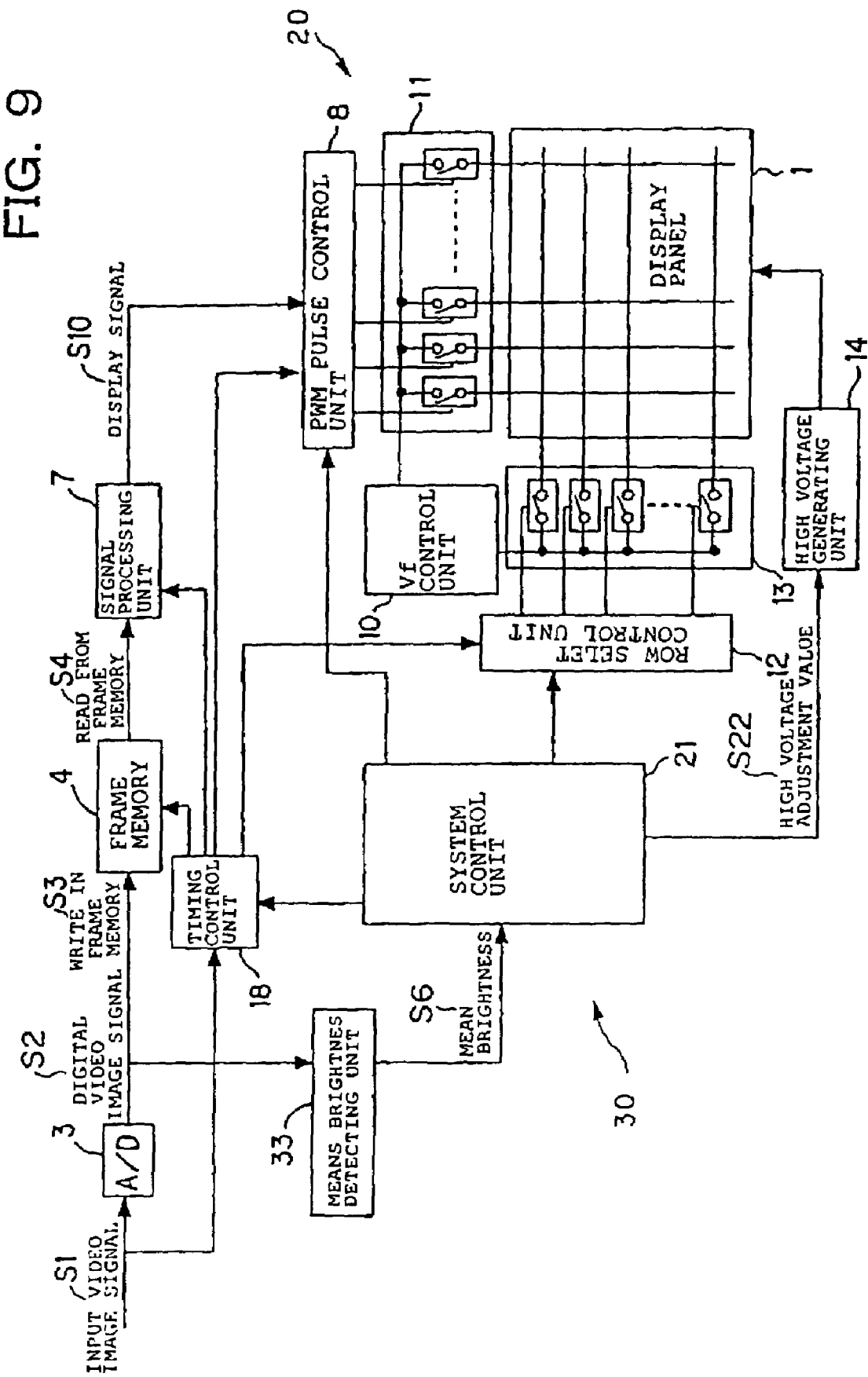
FIG. 9 is a diagram showing the structure of a video image display apparatus in accordance with a seventh embodiment.

A case of controlling a voltage that accelerates electrons emitted from the electron emitting elements on the display panel 1 which is output from the high voltage generating unit 14, as control means of the light emission brightness can be also realized by the same structure. FIG. 9 shows the structure of a seventh embodiment.

Figure 10:
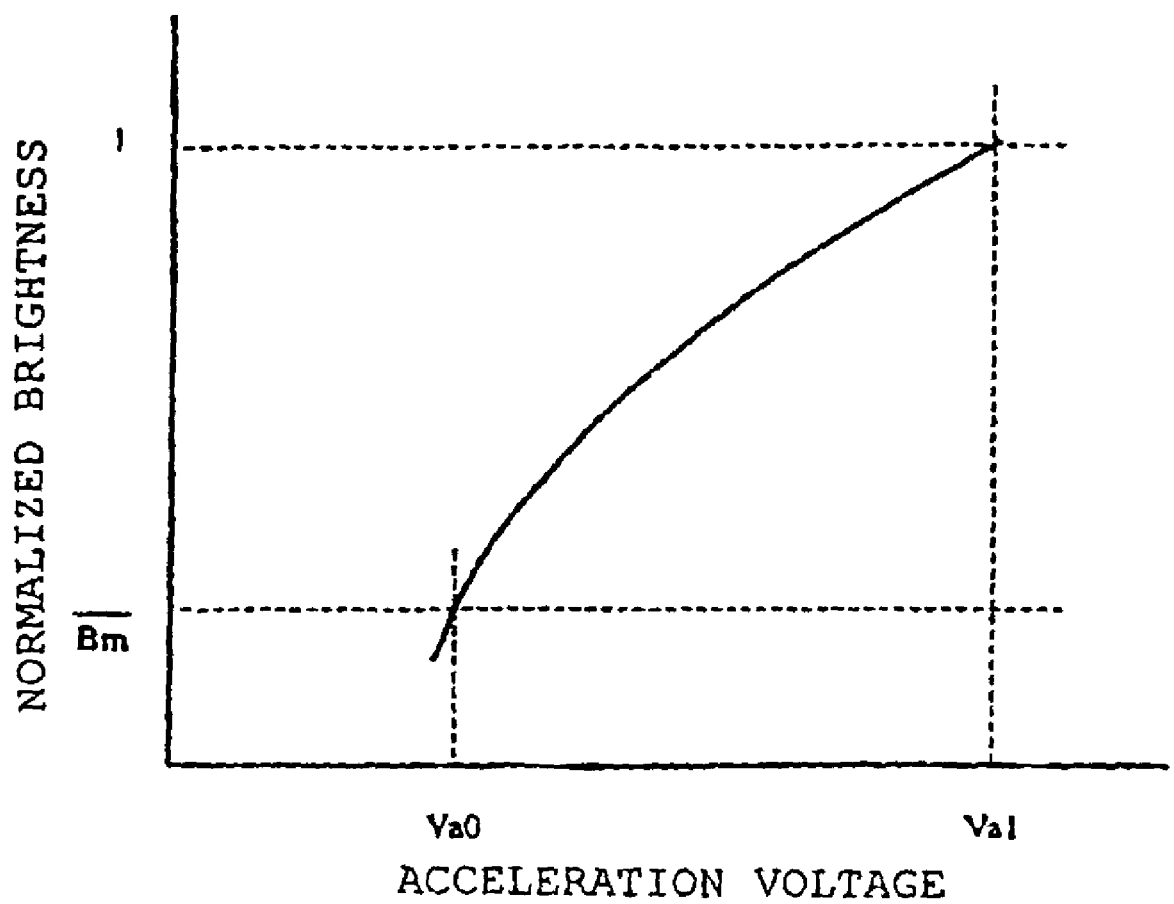
FIG. 10 is a graph showing a typical characteristic of brightness with respect to an accelerating voltage in the display panel used in the embodiment.

The system control unit 21 sets the high voltage adjustment value S22 with respect to the high voltage generating unit 14. The high voltage generating unit 14 outputs an acceleration voltage with the high voltage adjustment value S22 as the adjustment value of the acceleration voltage that accelerates the electrons. Because an energy that is applied to a phosphor is controlled by the acceleration voltage of the electrons, and the light emission brightness is determined by the energy that is given to the phosphor, if a period of time during which the element voltage is applied is constant, the brightness of the screen changes in accordance with the acceleration voltage Va as shown in FIG. 10. Therefore, the acceleration voltage Va (t) can be determined by using the brightness suppression coefficient K(t) as with the case of the drive voltage Vf described in the sixth embodiment.

This method can be also employed in the display apparatus using a CRT that accelerates the emitted electrons.

Also, in the case of an active matrix EL display panel, the potential of the common electrode that is common to the pixels of a common anode electrode, a common cathode electrode or the like of the EL element which constitutes each of the pixels may be controlled.

Eighth Embodiment

Figure 11:
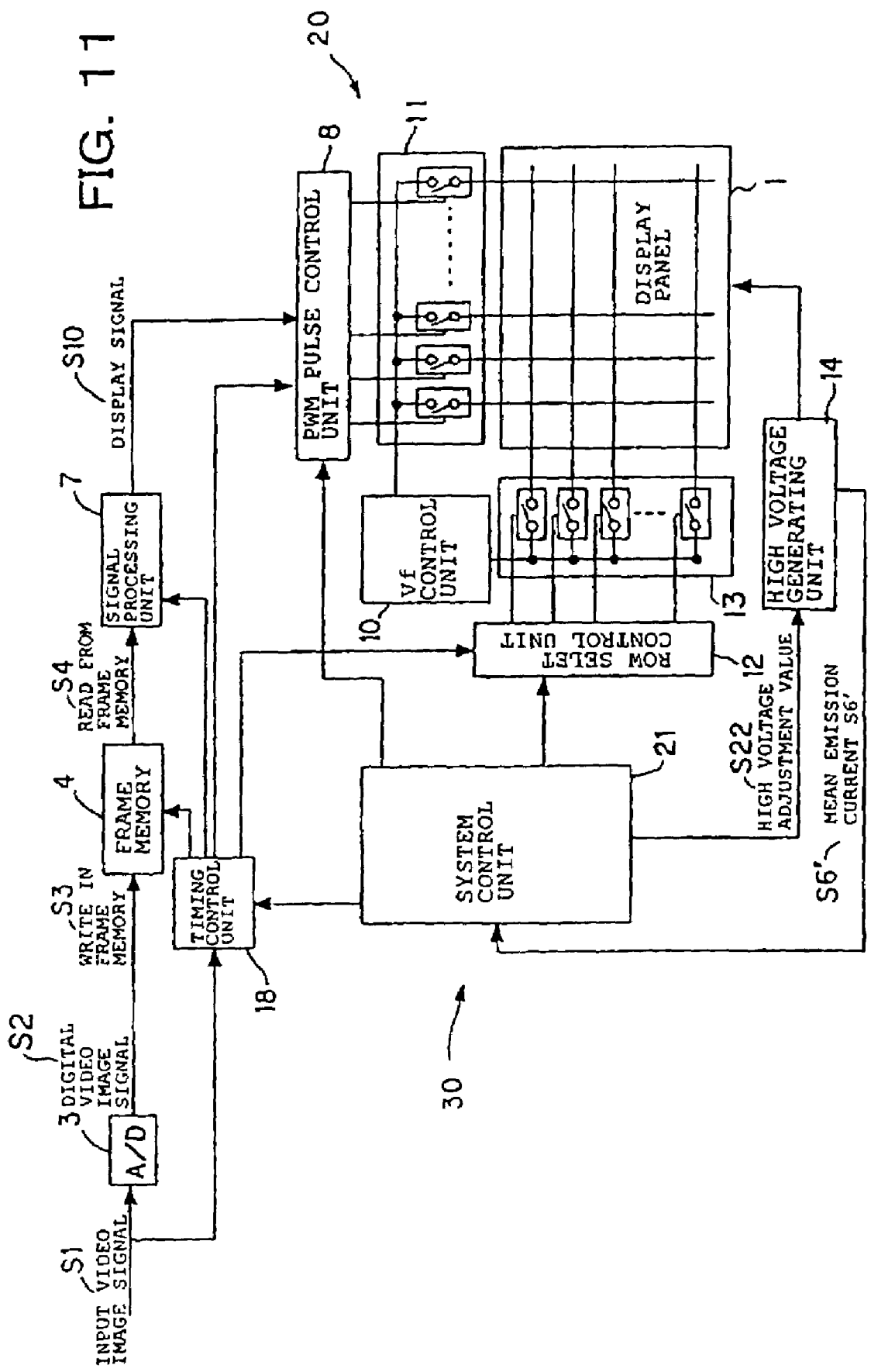
FIG. 11 is a diagram showing the structure of a video image display apparatus in accordance with an eighth embodiment.
Figure 12:
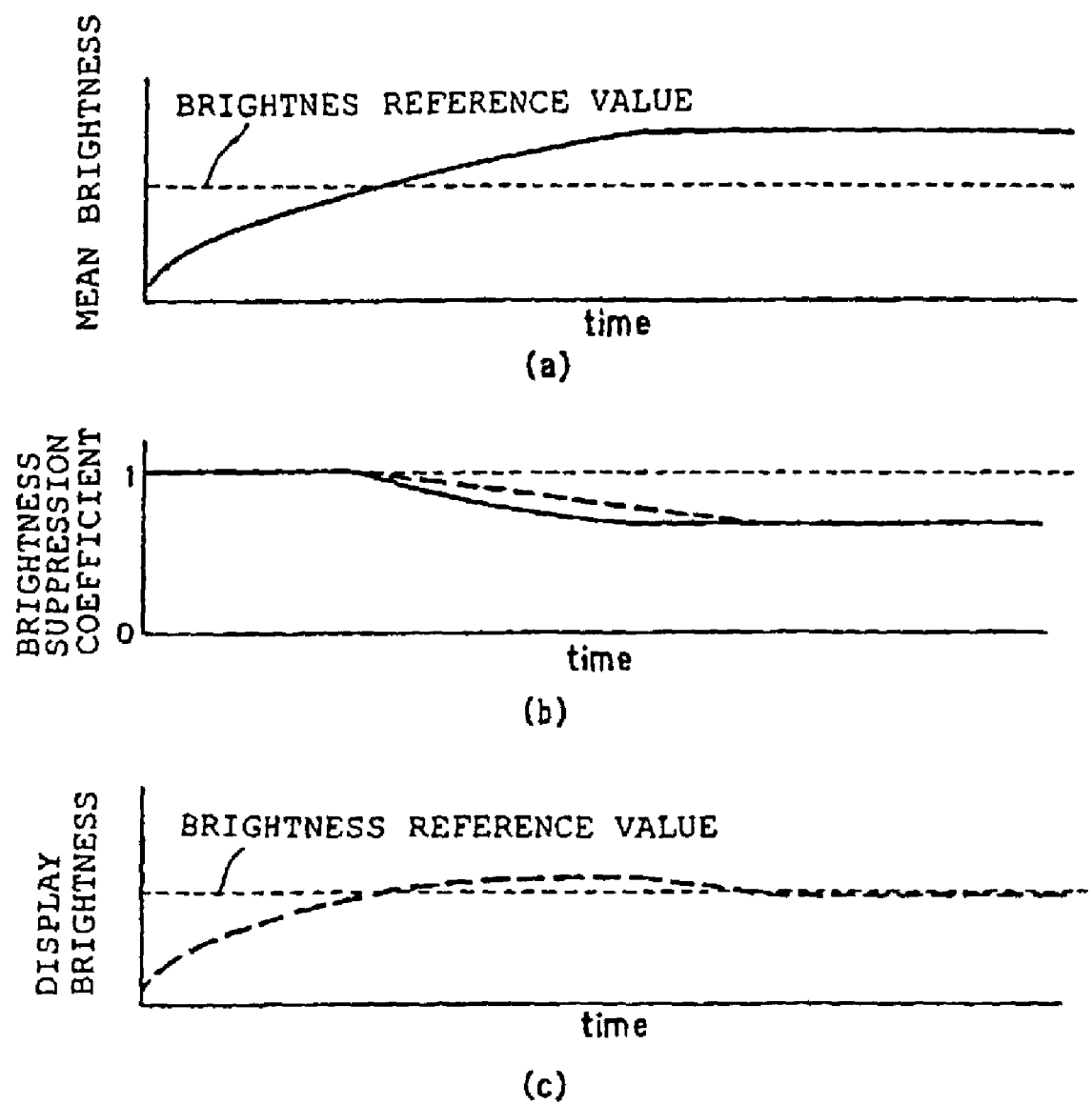
FIG. 12 is a graph for explaining a change in the brightness over time.

Also, the mean value S6' of the emission currents of the electron emitting element which are supplied from the high voltage generating unit 14 may be detected instead of detection of the mean brightness S6. The structure of this case is shown in FIG. 11. An emission current detecting unit that detects the mean current that is supplied to the display panel is disposed in the high voltage generating unit 14, and a mean emission current S6' is output to the system control unit 21. Since this structure constitutes a feedback system, structure other than the mean brightness detecting unit and the calculation expressions are identical with those in the fifth embodiment, and this embodiment can be realized by replacing the mean brightness S6 by the means emission current S6'.

According to this embodiment, because the brightness is measured from the current that is emitted in fact in the display panel, an object of increasing the display power and suppressing the heating can be effectively achieved.

This method can be used for a display apparatus using a CRT that accelerates the emission electrons. Also, in the case of an active matrix EL display panel, the potential of the common electrode that is common to the pixels of a common anode electrode, a common cathode electrode or the like of the EL element which constitutes each of the pixels or a current that flows in the common electrode may be detected, and the potential of the common electrode may be controlled on the basis of the detected result.

The display apparatus used in the present invention is not limited to a self-light-emission flat display apparatus that irradiates electron beams that are emitted from a plurality of electron emitting elements disposed on a matrix onto the phosphors to form a video image, but may be a display apparatus of another system such as an LCD, a PDP, a CRT or an EL as described above.

The interval of the brightness adjustment in the present invention is a period shorter than a one-frame scanning period and can be set to every one pixel, every given number of pixels, every one horizontal scanning period and every given number of horizontal scanning periods.

The brightness information corresponding to mean brightness (or APL) of the video image used in the present invention is obtained from a video image signal which is the input video image signal per se or results from subjecting the input video image signal to a signal processing that changes the brightness, a current value that flows into the common electrode of the display apparatus, or a signal that is determined on the basis of at least any one of those signals. Also, it is unnecessary that the mean brightness is a perfect mean brightness of the entire video image in one frame, but the mean brightness may be the mean brightness of the pixels that are appropriately sampled or a value corresponding to it such as the current value that flows in the common electrode.

It is preferable that the adjustment of the display brightness in the present invention is controlled by changing the brightness component of a digitized video image signal, a drive voltage that is applied in order to drive the pixels of the display apparatus or a voltage that is applied to the common electrode of the display apparatus.

The drive control method according to the present invention may be realized by a microcomputer as software or may be realized by hardware. Also, it is preferable that the method is dealt with as a design property (Intellectual Property/IP core) and logically synthesized with the IP core of another signal processing circuit and realized as the system LSI.

As was described above, according to the present invention, it is possible to conduct digital ABL processing that reduces visual annoyance and strangeness which is caused by such control.

What is claimed is:

1. A drive control device for controlling the driving of a display apparatus that displays a video image on the basis of an inputted video image signal, said device comprising:
a mean brightness detecting unit that obtains brightness information corresponding to a mean brightness of the video image of one frame;
a brightness controller for controlling a display brightness in the display apparatus in accordance with the brightness information obtained from said mean brightness detecting unit,
wherein said brightness controller conducts control so that the display brightness of the video image intermittently changes by a plurality of number of times within a one-frame scanning period for displaying the video image.

2. A drive control device according to claim 1, wherein said brightness controller is a digital signal processing circuit.

3. A drive control device according to claim 1, wherein said brightness controller includes a mean brightness detecting unit that obtains the brightness information, a control unit that outputs a brightness control value in accordance with the brightness information obtained by said mean brightness detecting unit, and an adjusting unit that adjusts the display brightness in accordance with the brightness control value output from said control unit, and
wherein said control unit calculates a target brightness control value for a video image of each frame based on the brightness information of the frame, and intermittently changes the brightness control value to output the brightness control value a plurality of number of times within a one-frame scanning period such that the brightness control value changes from a target brightness control value for a previous frame to a target brightness control value for a current frame.

4. A drive control device according to claim 1, wherein a control timing for changing the display brightness is synchronized with a dot clock and/or a horizontal synchronous signal.

5. A drive control device according to claim 1, wherein a timing at which the display brightness changes is determined in accordance with a difference of the mean brightness between successive frames.

6. A drive control device according to claim 1, wherein a timing at which the display brightness changes divides a one-frame scanning period into substantially equal parts.

7. A drive control device according to claim 1, wherein a timing at which the display brightness changes has a given time interval in several frames.

8. A drive control device according to claim 1, wherein the display brightness is controlled so as to reach a desired display brightness more quickly in the case where the mean brightness is increasing than in the case where the mean brightness is decreasing.

9. A drive control device according to claim 1, wherein the brightness information is obtained from a digitalized input video image signal or a video image signal that results from processing the input video image signal.

10. A drive control device according to claim 1, wherein the display brightness is controlled by changing the brightness component of a digitalized video image signal, changing a drive voltage that is applied in order to drive the pixels of said display apparatus, or changing a voltage that is applied to a common electrode of said display apparatus.

11. A drive control device according to claim 1, wherein the brightness information includes the mean brightness of the video image, a current value that flows into the common electrode of said display apparatus, or a signal determined on the basis of the mean brightness or the current value.

12. A drive control device according to claim 1, wherein said brightness controller includes a microcomputer that calculates a brightness control value for adjusting the display brightness or a signal processing circuit that calculates the brightness control value.

13. A display system that displays a video image on the basis of an inputted video image signal, said display system comprising:

a display apparatus; and a drive control device according to claim 1.

14. A display apparatus that displays a video image on the basis of an inputted video image signal, said display apparatus comprising:

a mean brightness detecting unit that obtains brightness information corresponding to a mean brightness of the video image of one frame;

a control unit that outputs a brightness control value in accordance with the brightness information obtained from said mean brightness detecting unit; and an adjusting unit that adjusts the display brightness in accordance with the brightness control value output from said control unit, wherein said control unit intermittently changes the brightness control value so as to change the display brightness of the video image by a plurality of number of times within a one-frame scanning period for displaying the video image.

15. A display apparatus according to claim 14, wherein said control unit calculates a target brightness control value for a video image of each frame based on the brightness information of the frame, and intermittently changes the brightness control value to output the brightness control value a plurality of number of times within a one-frame scanning period such that the brightness control value changes from a target brightness control value for a previous frame to a target brightness control value for a current frame.

16. A drive control method for controlling the driving of a display apparatus that displays a video image on the basis of an inputted video image signal, the method comprising the steps of:

obtaining brightness information corresponding to a mean brightness of the video image of one frame; and controlling a display brightness of the display apparatus in accordance with the brightness information by intermittently changing the display brightness of the video image by a plurality of number of times within a one-frame scanning period for displaying the video image.

17. An integrated circuit programmed to perform a drive control method according to claim 16.

18. A drive control method according to claim 16, wherein a target brightness control value is calculated for a video image of each frame based on the brightness information of the frame, and wherein intermittently changing the brightness control value comprises outputting the brightness control value a plurality of number of times within a one-frame scanning period such that the brightness control value changes from a target brightness control value for a previous frame to a target brightness control value for a current frame.

* * * * *